United States Patent
Maruyama et al.

(10) Patent No.: US 12,128,743 B2
(45) Date of Patent: Oct. 29, 2024

(54) RESIN WINDOW PANEL AND BONDING STRUCTURE OF RESIN WINDOW PANEL AND VEHICLE BODY

(71) Applicant: KABUSHIKI KAISHA TOYOTA JIDOSHOKKI, Kariya (JP)

(72) Inventors: Yuya Maruyama, Aichi-ken (JP); Ken Noda, Aichi-ken (JP); Hidenori Munekata, Aichi-ken (JP); Hisashi Muramatsu, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 232 days.

(21) Appl. No.: 17/624,613

(22) PCT Filed: Mar. 18, 2020

(86) PCT No.: PCT/JP2020/011886
§ 371 (c)(1),
(2) Date: Jan. 4, 2022

(87) PCT Pub. No.: WO2021/005838
PCT Pub. Date: Jan. 14, 2021

(65) Prior Publication Data
US 2022/0250446 A1 Aug. 11, 2022

(30) Foreign Application Priority Data
Jul. 8, 2019 (JP) .................................. 2019-126639

(51) Int. Cl.
*B60J 1/00* (2006.01)
*E06B 3/56* (2006.01)
(Continued)

(52) U.S. Cl.
CPC ............... *B60J 1/006* (2013.01); *E06B 3/56* (2013.01); *E06B 3/673* (2013.01); *B32B 27/36* (2013.01);
(Continued)

(58) Field of Classification Search
CPC .. B60J 1/006; E06B 3/56; E06B 3/673; B62D 25/06; B32B 27/36; C09J 11/06; C09J 201/00
(Continued)

(56) References Cited

U.S. PATENT DOCUMENTS 4,121,014 A * 10/1978 Shaffer ............. B32B 17/10036
428/424.2
2014/0178635 A1 6/2014 Imaizumi et al.
2018/0215240 A1 8/2018 Irie et al.

FOREIGN PATENT DOCUMENTS

DE 10 2016 015 021 A1 6/2017
JP 2002-2276 A 1/2002
(Continued)

OTHER PUBLICATIONS

Office Action issued Jul. 31, 2024 in German Application No. 11 2020 003 282.5.

*Primary Examiner* — Amy R Weisberg
*Assistant Examiner* — Dana D Ivey
(74) *Attorney, Agent, or Firm* — Sughrue Mion, PLLC

(57) ABSTRACT

A resin window panel provided in a vehicle including a vehicle body that has a peripheral edge surrounding a window frame, the resin window panel that is attached to the peripheral edge with an adhesive containing a plasticizer, the resin window panel includes: a first resin panel part whose top surface has a hard coating layer, the first resin panel part made of polycarbonate; and a second resin panel part
(Continued)

stacked on a backside surface of the first resin panel part, the second resin panel part made of polyethylene terephthalate.

3 Claims, 6 Drawing Sheets

(51) Int. Cl.
*E06B 3/673* (2006.01)
*B32B 27/36* (2006.01)
*B62D 25/06* (2006.01)
*C09J 11/06* (2006.01)
*C09J 201/00* (2006.01)

(52) U.S. Cl.
CPC ............... *B62D 25/06* (2013.01); *C09J 11/06* (2013.01); *C09J 201/00* (2013.01)

(58) Field of Classification Search
USPC ......................................... 296/146.15, 184.1
See application file for complete search history.

(56) References Cited

FOREIGN PATENT DOCUMENTS

| | | | | |
|---|---|---|---|---|
| JP | 2014184729 A | * | 10/2014 | ......... B29C 45/0001 |
| JP | 2015196444 A | * | 11/2015 | |
| JP | 2016-203533 A | | 12/2016 | |
| JP | 6623974 B2 | * | 12/2019 | |
| WO | 2013/021848 A1 | | 2/2013 | |
| WO | 2017/061553 A1 | | 4/2017 | |

* cited by examiner

RESIN WINDOW PANEL AND BONDING STRUCTURE OF RESIN WINDOW PANEL AND VEHICLE BODY

CROSS REFERENCE TO RELATED APPLICATION

This application is a National Stage of International Application No. PCT/JP2020/011886 filed on Mar. 18, 2020, claiming priority based on Japanese Patent Application No. 2019-126639 filed on Jul. 8, 2019, the contents of all of which are incorporated herein by reference in their entirety.

TECHNICAL FIELD

The present disclosure relates to a resin window panel and a bonding structure of the resin window panel and a vehicle body.

BACKGROUND ART

In recent years, resin windows have been adopted as roof windows in automobiles, which achieves light weighting of the roof windows. Roof window panels in which polycarbonate (PC), for example, is used as the material of the resin windows have been known.

When polycarbonate is used as the material for a resin window panel, it is conceivable to fix the resin window panel to a vehicle body by using a urethane-based adhesive. However, a plasticizer contained in the urethane-based adhesive may be highly compatible with polycarbonate. Thus, when the plasticizer is migrated to polycarbonate, a surface layer of the resin window panel may be deteriorated. Therefore, an alloy material layer obtained by polymer alloying in which polycarbonate and polyethylene terephthalate (PET) are blended is formed on the resin window panel corresponding to a position of the adhesive, so that the resin window panel may be fixed to the vehicle body with the adhesive interposed between the vehicle body and the alloy material layer. In this case, the resin window panel having the alloy material layer is formed by two-color molding as injection molding.

For example, a resin member and a structure of a vehicle body having the resin member disclosed in Patent Literature 1 have been known as the conventional resin window panel and the conventional bonding structure of the resin window panel and the vehicle body. Patent Literature 1 discloses that the resin member as a window member for a vehicle has a resin base material and an adhesive layer for fixing the resin base material to other members. The window member for the vehicle is fixed to the vehicle body with the adhesive layer. A colored resin layer is formed on a surface of the resin base material of the resin member, specifically on such surface facing the vehicle body and corresponding to the adhesive layer.

CITATION LIST

Patent Literature

Patent Literature 1: Japanese Patent Application Publication No. 2016-203533

SUMMARY OF INVENTION

Technical Problem

However, when the alloy material layer is formed on the resin window panel made of polycarbonate, specifically on its surface corresponding to the adhesive, the thickness of the alloy material layer is added to that of the resin window panel. Thus, there are problems in which the design of the resin window panel is restricted and in which a passenger compartment space is reduced in size. In particular, the thickness of the resin window panel having the alloy material layer formed by the two-color molding tends to be large; therefore, it is difficult to reduce such thickness without design restrictions and without reducing the size of the passenger compartment space. When the colored resin layer is formed on the resin base material of the resin member as disclosed in Patent Literature 1, the thickness of the colored resin layer is added to that of the resin base material. This also causes the above-described problems.

The present disclosure has been made in view of the above problems, and its objective is to provide a resin window panel that is not affected by deterioration and the like due to a plasticizer contained in a urethane-based adhesive without design restrictions of the resin window panel and without reducing the size of a passenger compartment space even when the resin window panel is made of polycarbonate, and to provide a bonding structure of the resin window panel and a vehicle body.

Solution to Problem

To solve the above-described problems, in the present disclosure, a resin window panel provided in a vehicle including a vehicle body that has a peripheral edge surrounding a window frame, the resin window panel that is attached to the peripheral edge with an adhesive containing a plasticizer, the resin window panel includes: a first resin panel part whose top surface has a hard coating layer, the first resin panel part made of polycarbonate; and a second resin panel part stacked on a backside surface of the first resin panel part, the second resin panel part made of polyethylene terephthalate.

In the present disclosure, the second resin panel part made of polyethylene terephthalate is stacked on the backside surface of the first resin panel part. Thus, even when the resin window panel is fixed to the vehicle by using the adhesive, the plasticizer contained in the adhesive is blocked by the second resin panel part and is not migrated to the first resin panel part. Therefore, even when the resin window panel is made of polycarbonate, such resin window panel is not affected by deterioration and the like due to migration of the plasticizer contained in the adhesive; additionally, the thickness of the resin window panel can be reduced. As a result, there are no design restrictions of the resin window panel and no size reduction of a passenger compartment space.

In the above-described resin window panel, an intermediate layer formed from an adhesive may be formed between the first resin panel part and the second resin panel part. In this case, the intermediate layer formed from the adhesive is formed between the first resin panel part and the second resin panel part, which can maintain a bonding strength between the first resin panel part and the second resin panel part.

In the above-described resin window panel, the second resin panel part may be stacked on the backside surface of the first resin panel part corresponding to a position of a panel adhesion portion that is formed from the adhesive and that is for attaching the resin window panel to the peripheral edge. In this case, the second resin panel part can be formed at the position of the panel adhesion portion that is formed from the adhesive and that is necessary to attach the resin window panel to the peripheral edge, which can reduce the weight of the resin window panel.

In the present disclosure, there are provided the above-described resin window panel and the panel adhesion portion where the resin window panel is bonded to the peripheral edge. The panel adhesion portion is interposed between the second resin panel part and the peripheral edge and formed from an adhesive containing the plasticizer.

In the present disclosure, the resin window panel is attached to the peripheral edge of the vehicle body with the panel adhesion portion formed from the adhesive. The resin window panel forms a vehicle window. The panel adhesion portion is interposed between the second resin panel part and the peripheral edge of the vehicle body. Therefore, even when the resin window panel is made of polycarbonate, such resin window panel is not affected by deterioration and the like due to the plasticizer contained in the adhesive; additionally, the thickness of the resin window panel can be reduced. As a result, there are no design restrictions of the resin window panel and no size reduction of a passenger compartment space.

Advantageous Effects of Invention

According to the present disclosure, it is possible to provide a resin window panel that is not affected by deterioration and the like due to a plasticizer contained in a urethane-based adhesive without design restrictions and without reducing the size of a passenger compartment space even when the resin window panel is made of polycarbonate, and a bonding structure of the resin window panel and a vehicle body.

DESCRIPTION OF EMBODIMENTS

First Embodiment

Hereinafter, a resin window panel and a bonding structure of the resin window panel and a vehicle body according to a first embodiment will be described with reference to the accompanying drawings. In the present embodiment, the resin window panel and the bonding structure of the resin window panel and the vehicle body are applied to an automobile as a vehicle.

Figure 1:
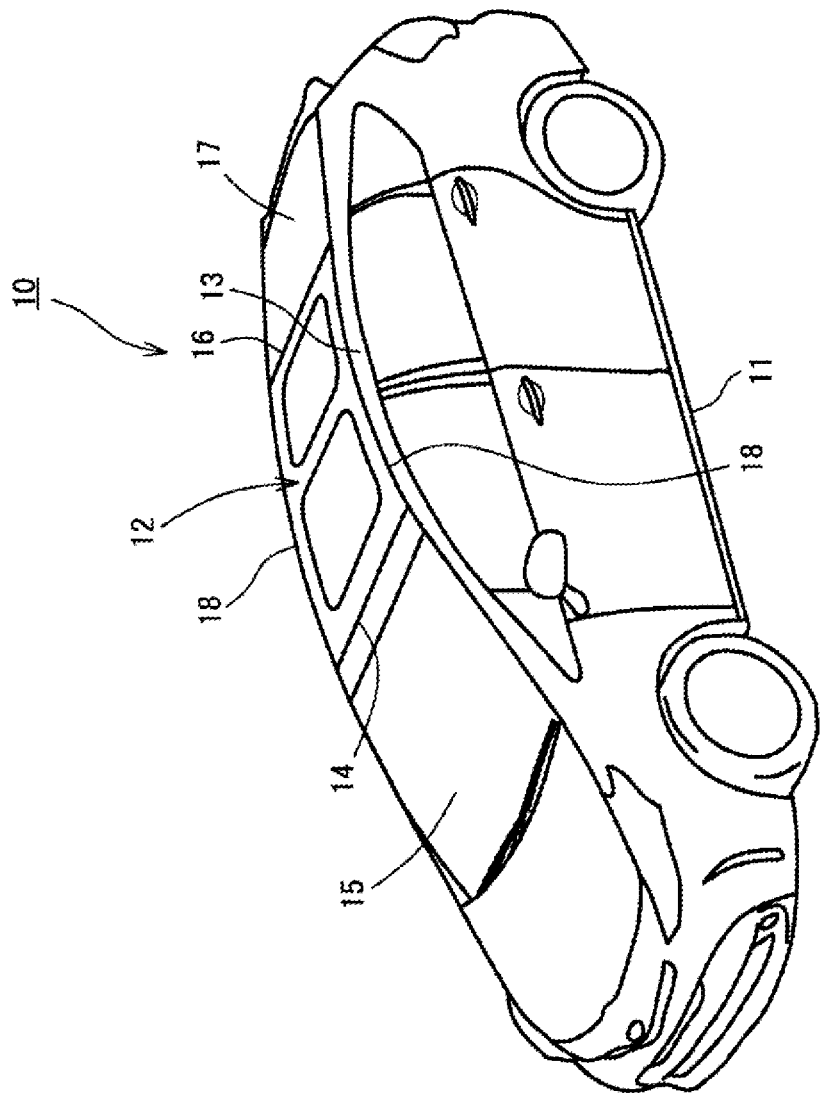
FIG. 1 is a perspective view of a vehicle provided with a resin window panel according to a first embodiment.

As illustrated in FIG. 1, a vehicle 10 includes a vehicle body 11, a resin window panel 12 forming a part of a roof, and a pair of left and right roof side members 13 as a part of the vehicle body 11.

Figure 2:
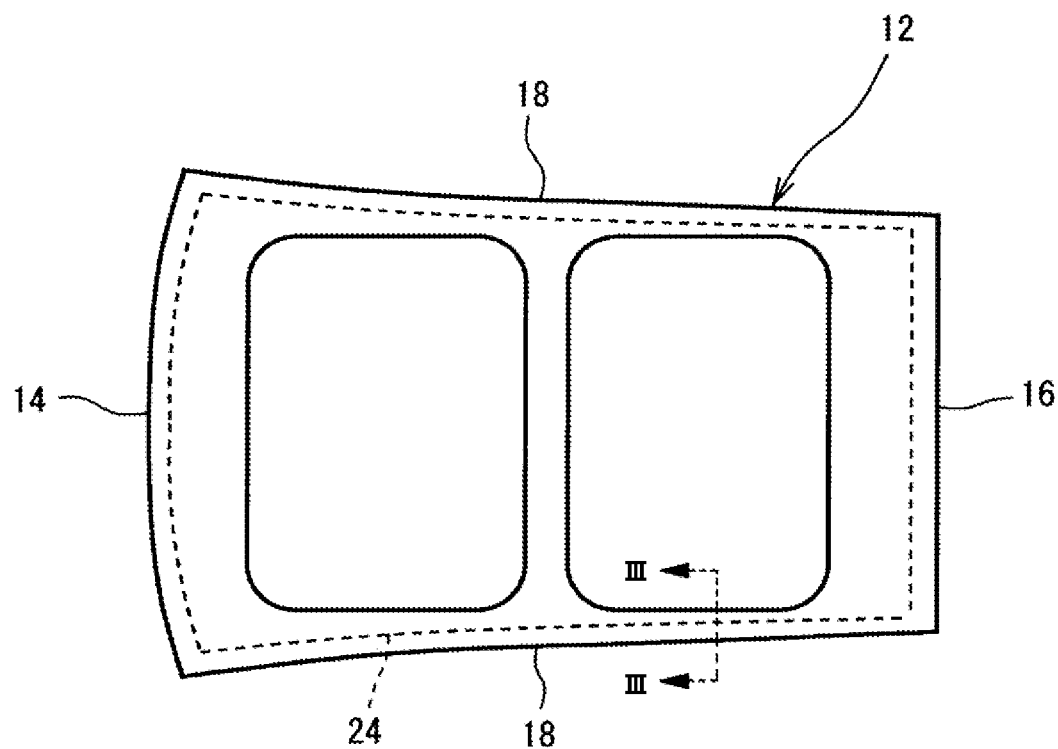
FIG. 2 is a plan view of the resin window panel according to the first embodiment.

As illustrated in FIG. 1 and FIG. 2, the resin window panel 12 has a substantially rectangular shape in a plan view, but has a gradual curved surface. As illustrated in FIG. 1, a front edge 14 of the resin window panel 12 follows along an upper edge of a windshield window 15 of the vehicle 10. A rear edge 16 of the resin window panel 12 follows along a front edge of a rear roof 17 that forms the roof, together with the resin window panel 12 that also forms the roof. Side edges 18 located on left and right of the resin window panel 12 follow along the pair of left and right roof side members 13. The windshield window 15, the rear roof 17 and the pair of left and right roof side members 13 correspond to a peripheral edge surrounding the window frame.

Figure 3:
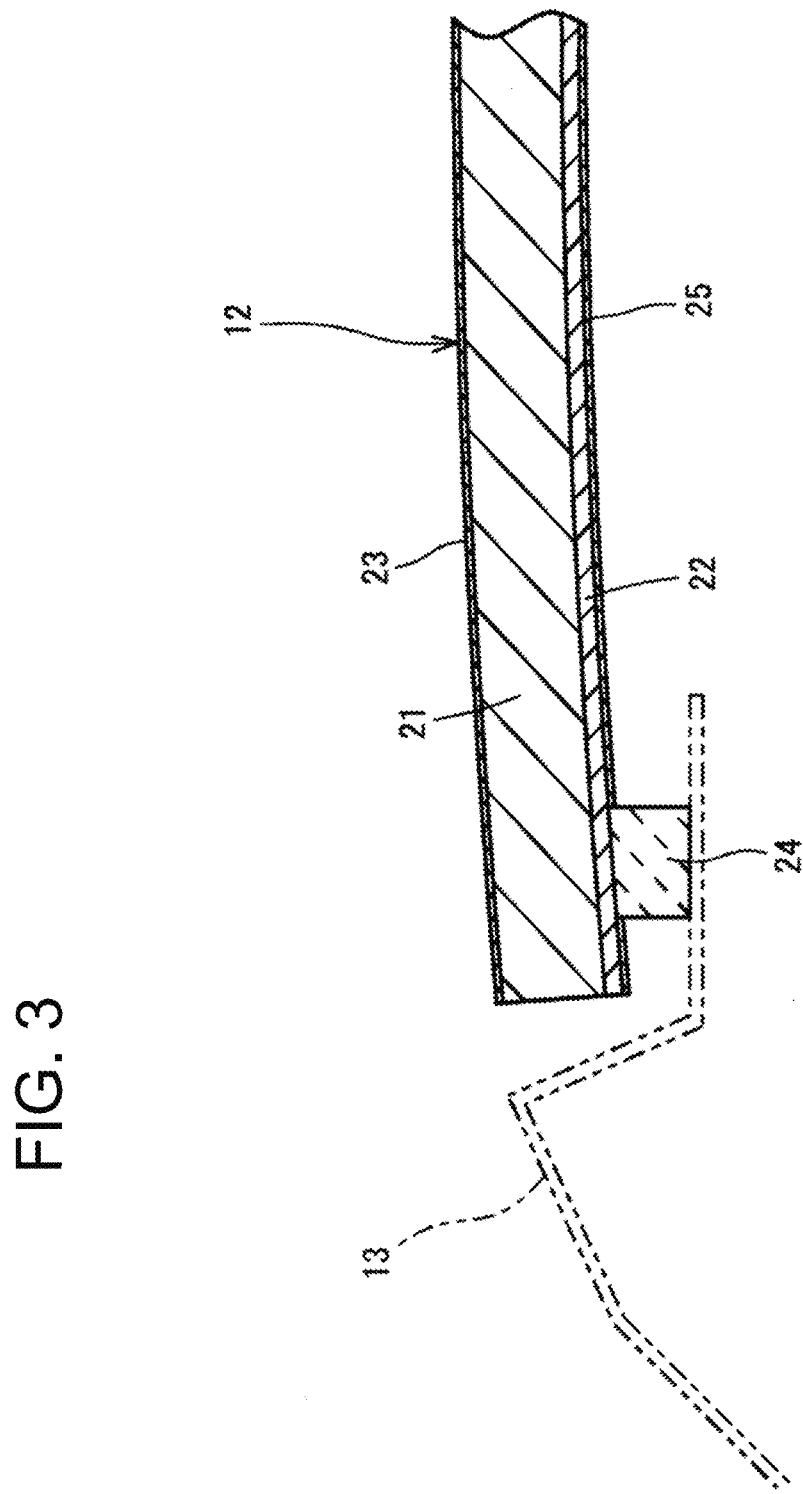
FIG. 3 is a cross-sectional view illustrating a bonding structure of the resin window panel and a vehicle body according to the first embodiment, taken along an a III-III line in FIG. 2.
Figure 4:
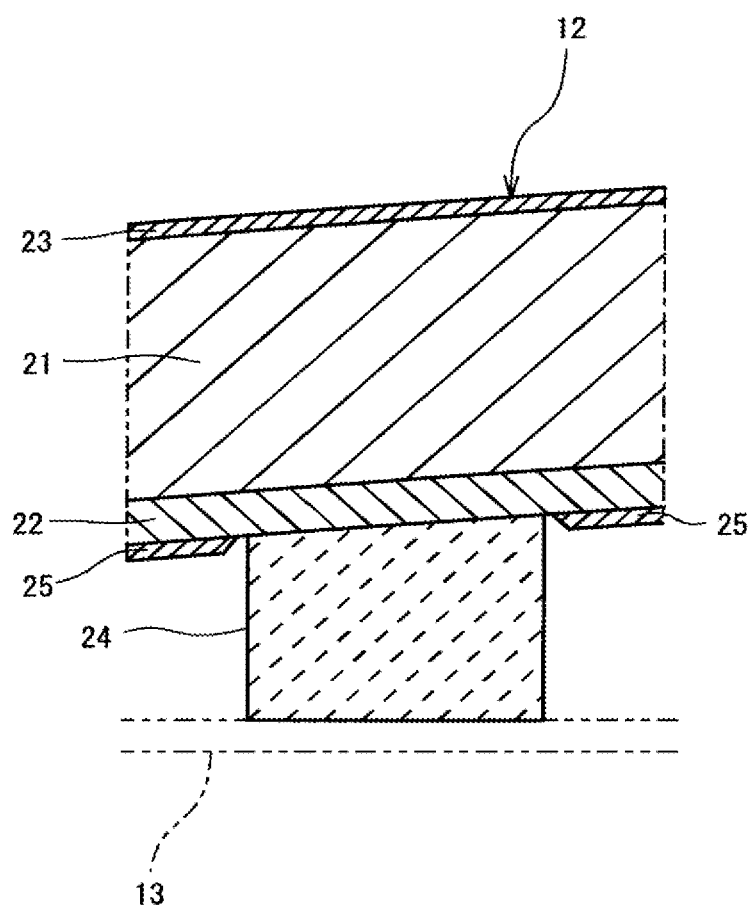
FIG. 4 is a cross-sectional view illustrating a main part of the resin window panel and the bonding structure of the resin window panel and the vehicle body according to the first embodiment.

As illustrated in FIG. 3 and FIG. 4, the resin window panel 12 has a first resin panel part 21 made of polycarbonate (PC) and a second resin panel part 22 made of polyethylene terephthalate (PET) and stacked below the first resin panel part 21.

The first resin panel part 21 has a transparent resin layer (not illustrated) made of transparent polycarbonate and an opaque resin layer (not illustrated) stacked below the transparent resin layer. The opaque resin layer is made of opaque polycarbonate to which a colorant is added, and has a black color. The term "transparent" means that the transmittance of visible light defined by regulations and public announcement is satisfied. For example, in Japan, the transmittance of visible light set forth in the Road Transport Vehicle Act or public announcement that defines particulars of the safety standard for road transport vehicles simply needs to be satisfied. The term "opaque" means that the transmittance of visible light is lower as compared with the transparent resin layer.

A hard coating layer 23 is formed on a top surface of the first resin panel part 21 (a top surface of the transparent resin layer). The hard coating layer 23 is a hard coating layer made of, for example, a silicone-based ultraviolet curing acrylic resin containing a silicone-based compound. Since the hard coating layer 23 contains the silicone-based compound, such silicone-based compound is immobilized on a coating film surface (a hard coated surface) of the hard coating layer 23, which increases its surface hardness. This results in the hard coating layer 23 having excellent scratch resistance and weather resistance.

Next, the second resin panel part 22 will be described. The second resin panel part 22 is made of polyethylene terephthalate (PET). The second resin panel part 22 is provided in order to prevent migration in which a plasticizer (for example, phthalic acid ester) contained in a urethane-based adhesive that is highly compatible with polycarbonate is migrated to the first resin panel part 21. The thickness of the second resin panel part 22 of the present embodiment is about 25 µm. As illustrated in FIG. 3 and FIG. 4, the urethane-based adhesive is an adhesive forming a panel adhesion portion 24 when the resin window panel 12 is attached to the roof side members 13 which forms a part of the peripheral edge of the vehicle body 11. As illustrated in FIG. 2, the panel adhesion portion 24 is formed along the front edge 14, the rear edge 16, and the side edges 18 of the resin window panel 12. The panel adhesion portion 24 formed from the urethane-based adhesive has appropriate elasticity so as to absorb thermal expansion and thermal contraction of the resin window panel 12.

The second resin panel part 22 has the same dimension as the first resin panel part 21. A hard coating layer 25 is formed on a backside surface of the second resin panel part 22 (a surface facing a passenger compartment). The hard coating layer 25 is a hard coating layer made of the silicone-based ultraviolet curing acrylic resin that is the same material as the hard coating layer 23 formed on the top surface of the first resin panel part 21.

Both polycarbonate of the first resin panel part 21 and polyethylene terephthalate of the second resin panel part 22 are thermoplastic resins. The first resin panel part 21 and the second resin panel part 22 of the present embodiment are formed by multi-layered co-extrusion molding using an extrusion molding machine.

The resin window panel 12 is attached to the peripheral edge of the vehicle body 11 with the panel adhesion portion 24 formed from the urethane-based adhesive interposed between the second resin panel part 22 and the roof side members 13 which forms a part of the peripheral edge. As described above, a bonding structure of the resin window panel 12 and the vehicle body of the present embodiment includes the resin window panel 12, the panel adhesion portion 24 bonded to the resin window panel 12, and the roof side members 13 which forms a part the peripheral edge. The panel adhesion portion 24 is formed from the urethane-based adhesive and interposed between the second resin panel part 22 and the roof side members 13.

Next, effects of the resin window panel 12 and the bonding structure of the resin window panel 12 and the vehicle body will be described. The resin window panel 12 is attached to the roof side members 13 with the panel adhesion portion 24. The panel adhesion portion 24 is interposed between the second resin panel part 22 and the roof side members 13. The panel adhesion portion 24 is formed from the urethane-based adhesive and has appropriate elasticity, and therefore absorbs thermal expansion and thermal contraction that occur in a surface direction of the resin window panel 12.

Although the urethane-based adhesive forming the panel adhesion portion 24 contains the plasticizer that is highly compatible with polycarbonate, migration of the plasticizer to the first resin panel part 21 is blocked by the second resin panel part 22. Therefore, the second resin panel part 22 prevents surface deterioration due to migration of the plasticizer. In addition, the first resin panel part 21 and the second resin panel part 22 are formed by multi-layered co-extrusion molding by using the extrusion molding machine, which further reduces the thickness and the weight of the resin window panel 12 as compared with those obtained by two-color molding as injection molding.

The present embodiment exerts the following effects.

(1) The second resin panel part 22 is stacked on a backside surface of the first resin panel part 21. The second resin panel part 22 is made of polyethylene terephthalate. Thus, even when the resin window panel 12 is fixed to the vehicle 10 by using the urethane-based adhesive, the plasticizer contained in the urethane-based adhesive is blocked by the second resin panel part 22 and not migrated to the first resin panel part 21 made of polycarbonate. As a result, even when the resin window panel 12 is made of polycarbonate, such resin window panel 12 is not affected by deterioration and the like due to migration of the plasticizer contained in the urethane-based adhesive. Since the thickness of the resin window panel 12 can be thinner as compared with a resin window panel obtained by the two-color molding as the injection molding, there are no design restrictions of the resin window panel 12 and no size reduction of the passenger compartment space.

(2) The bonding structure of the resin window panel 12 and the vehicle body includes the resin window panel 12 attached to the roof side members 13 and the panel adhesion portion 24 with which the resin window panel 12 and the roof side members 13 are bonded to each other. The panel adhesion portion 24 is formed from the urethane-based adhesive and interposed between the second resin panel part 22 and the roof side members 13. The resin window panel 12 is attached to the roof side members 13 of the vehicle body 11 with the panel adhesion portion 24 formed from the urethane-based adhesive. The resin window panel 12 forms a vehicle window. The panel adhesion portion 24 is interposed between the second resin panel part 22 and the roof side members 13 of the vehicle body 11. Therefore, even when the resin window panel 12 is made of polycarbonate, such resin window panel 12 is not affected by deterioration and the like due to the plasticizer contained in the urethane-based adhesive. In addition, there are no design restrictions of the resin window panel 12 and no size reduction of the passenger compartment space.

(3) The first resin panel part 21 and the second resin panel part 22 are formed by the multi-layered co-extrusion molding by using the extrusion molding machine. Thus, the thickness of the resin window panel 12 is thinner as compared with a resin window panel obtained by the two-color molding as the injection molding, which can further reduce the weight and manufacturing costs of the resin window panel 12. The extrusion molding enables the resin window panel 12 to be formed into a flat plate shape; besides, such resin window panel 12 having the flat plate shape is subjected to heat treatment, thereby obtaining the resin window panel 12 having a curved surface. Although the second resin panel part 22 can be stuck to the first resin panel part 21 having the curved surface obtained by the injection molding, it is difficult to stick the second resin panel part 22 to the first resin panel part 21 without wrinkles.

(4) Since the hard coating layer 25 is formed on the backside surface of the second resin panel part 22 (the surface facing the passenger compartment), the second resin panel part 22 can be protected. The hard coating layer 25 has excellent scratch resistance and weather resistance, as with the hard coating layer 23 formed on the top surface of the first resin panel part 21.

Second Embodiment

Next, a resin window panel and a bonding structure of the resin window panel and a vehicle body according to a second embodiment will be described. The resin window panel of the present embodiment is different from the first embodiment in that an intermediate layer is formed between the first resin panel part and the second resin panel part. In the present embodiment, the above-described description is applied to the same configuration as that of the first embodiment and the same elements are denoted by the same reference numerals.

Figure 5:
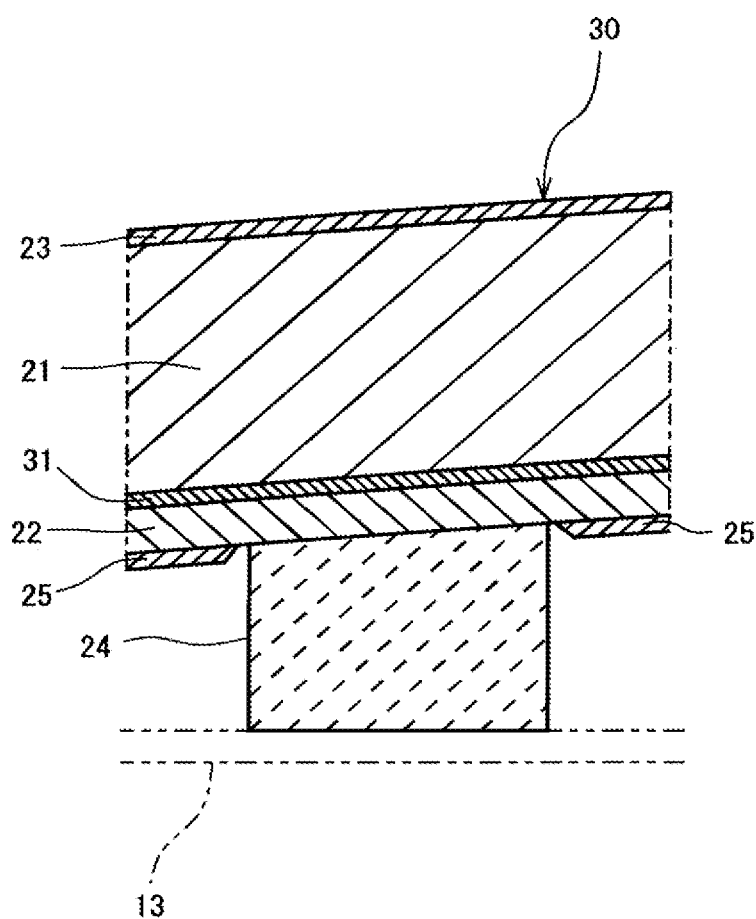
FIG. 5 is a cross-sectional view illustrating a main part of a resin window panel and a bonding structure of the resin window panel and a vehicle body according to a second embodiment.

As illustrated in FIG. 5, a resin window panel 30 of the present embodiment has an intermediate layer 31 formed between the first resin panel part 21 and the second resin panel part 22. The material of the intermediate layer 31 is an epoxy-based adhesive. The material of the intermediate layer 31 simply needs to be a structural adhesive such as the urethane-based adhesive or an acrylic adhesive in addition to the epoxy-based adhesive. When the material of the intermediate layer 31 is an adhesive having a function to prevent migration of the plasticizer to the first resin panel part 21, this is more preferable because the intermediate layer 31 can block migration of the plasticizer to the first resin panel part 21.

The present embodiment exerts effects equivalent to those (1) to (4) of the first embodiment. The intermediate layer 31 is formed between the first resin panel part 21 and the second resin panel part 22 in the resin window panel 30, which increases adhesive strength between the first resin panel part 21 and the second resin panel part 22. This can prevent peeling of the second resin panel part 22 from the first resin panel part 21. Therefore, weather resistance of the resin window panel 30 can be further improved.

Third Embodiment

Next, a resin window panel and a bonding structure of the resin window panel and a vehicle body according to a third embodiment will be described. In the resin window panel of the present embodiment, a configuration of the second resin panel part is different from the first embodiment. In the present embodiment, the above-described description is applied to the same configuration as that of the first embodiment and the same elements are denoted by the same reference numerals.

Figure 6:
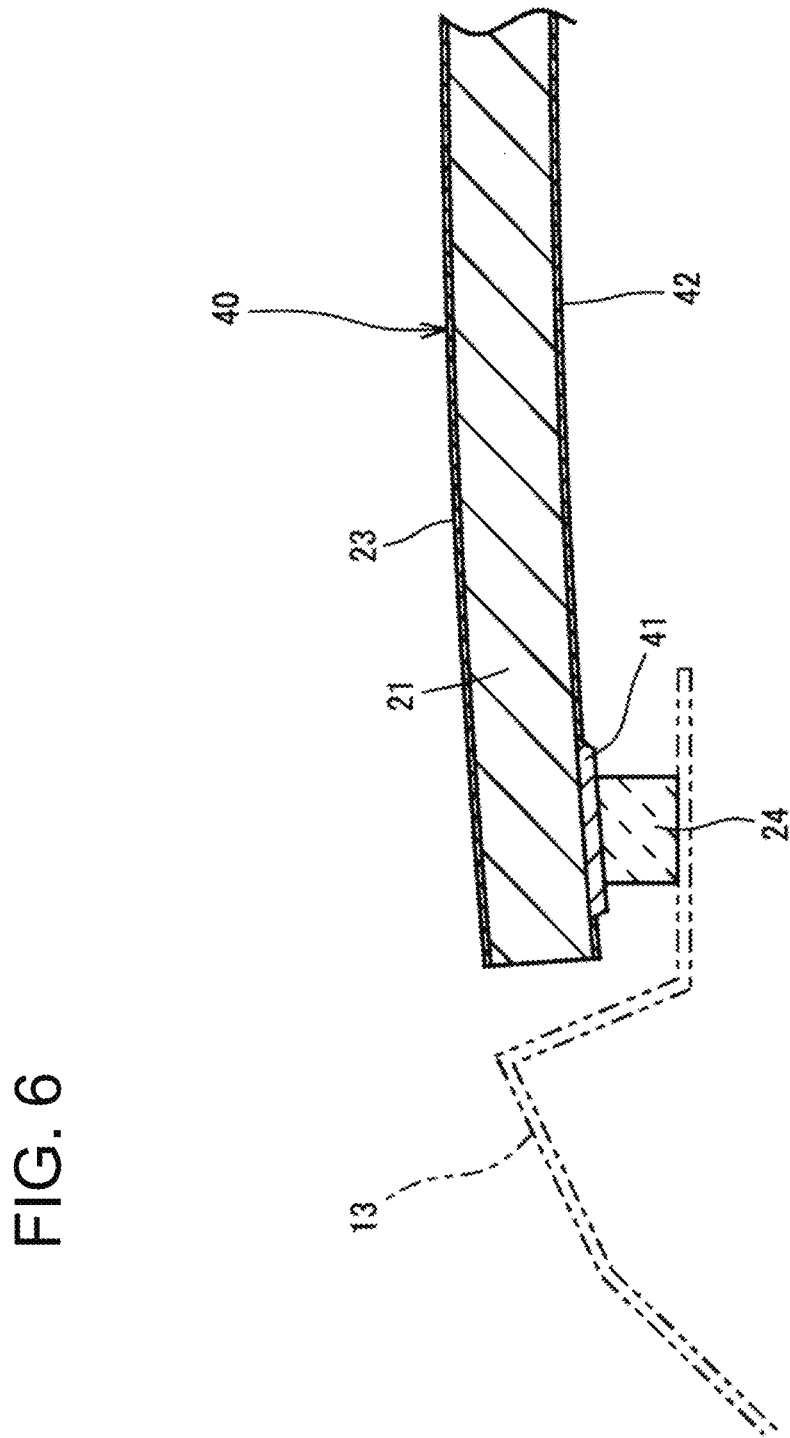
FIG. 6 is a cross-sectional view illustrating a main part of a resin window panel and a bonding structure of the resin window panel and a vehicle body according to a third embodiment.

As illustrated in FIG. 6, in a resin window panel 40 of the present embodiment, a second resin panel part 41 is stacked on a backside surface of the first resin panel part 21 corresponding to a position of the panel adhesion portion 24. A hard coating layer 42 is formed on the backside surface of the first resin panel part 21, except for the position of the panel adhesion portion 24. As with the second embodiment, an intermediate layer may be provided between the first resin panel part 21 and the second resin panel part 41.

The present embodiment exerts effects equivalent to those (1) to (4) of the first embodiment. In addition, the second resin panel part 41 is stacked on the backside surface of the first resin panel part 21 corresponding to the position of the panel adhesion portion 24 that is formed from the urethane-based adhesive and that is for attaching the resin window panel 40 to the roof side members 13. Therefore, the second resin panel part 41 can be formed at the position of the panel adhesion portion 24 that is formed from the urethane-based adhesive and that is necessary to attach the resin window panel 40 to the roof side members 13. Thus, the weight of the resin window panel 40 can be further reduced, in addition to cost reduction of the material of the second resin panel part 41.

The present disclosure is not limited to the above-described embodiments, but can be modified within the scope of the disclosure as exemplified below.

In the above-described embodiments, the thickness of the second resin panel part is about 25 µm, but this is not limited to about 25 µm. The thickness of the second resin panel part may be about 100 µm, for example. Although the thickness of the resin window panel increases along with an increase of the thickness of the second resin panel part, migration of the first resin panel part to the plasticizer is more reliably prevented.

In the above-described embodiments, the resin window panel is formed by the extrusion molding, but a forming method is not limited to the extrusion molding. The injection molding instead of the extrusion molding is acceptable. When the injection molding is adopted, the first resin panel part is formed by the injection molding; besides, the second resin panel part is simply stacked below such first resin panel part.

In the above-described embodiments, the resin window panel and the bonding structure of the resin window panel and the vehicle body are applied to a roof panel as an example. However, the present disclosure may be applicable to components other than the roof panel. The resin window panel and the bonding structure of the resin window panel and the vehicle body of the present disclosure are applicable to side window panels, a rear window panel, and the like.

In the above-described embodiments, an automobile is described as an example of the vehicle, but the vehicle is not limited to the automobile. The vehicle may be, for example, a railroad vehicle in addition to the automobile.

REFERENCE SIGNS LIST 10 vehicle
11 vehicle body
12, 30, 40 resin window panel
13 roof side member
15 windshield window
17 rear roof
21 first resin panel part
22, 41 second resin panel part
23 hard coating layer (first resin panel part)
24 panel adhesion portion
25 hard coating layer (second resin panel part)
31 intermediate layer

The invention claimed is:

1. A resin window panel provided in a vehicle including a vehicle body that has a peripheral edge surrounding a window frame, the resin window panel that is attached to the peripheral edge with an adhesive containing a plasticizer, the resin window panel comprising:
    a first resin panel part whose top surface has a hard coating layer, the first resin panel part being made of polycarbonate;
    a second resin panel part stacked on a backside surface of the first resin panel part, the second resin panel part being made of polyethylene terephthalate;
    an intermediate layer formed from an adhesive between the first resin panel part and the second resin panel part; and
    the first resin panel part having a transparent resin layer made of transparent polycarbonate and an opaque resin layer stacked below the transparent resin layer, the opaque resin layer having transmittance of visible light lower as compared with the transparent resin layer.

2. The resin window panel according to claim 1, wherein the second resin panel part is stacked on the backside surface of the first resin panel part corresponding to a position of a panel adhesion portion that is formed from the adhesive and that is for attaching the resin window panel to the peripheral edge.

3. A bonding structure of a resin window panel and a vehicle body comprising:
    the resin window panel according to claim 1; and
    a panel adhesion portion where the resin window panel is bonded to the peripheral edge, wherein
    the panel adhesion portion formed from an adhesive containing the plasticizer is interposed between the second resin panel part and the peripheral edge.

* * * * *